Patented Mar. 8, 1932

1,848,721

UNITED STATES PATENT OFFICE

MAX H. HUBACHER, OF NITRO, WEST VIRGINIA, ASSIGNOR TO THE RUBBER SERVICE LABORATORIES CO., OF AKRON, OHIO, A CORPORATION OF OHIO

PROCESS OF VULCANIZING RUBBER AND PRODUCT OBTAINED THEREBY

No Drawing. Application filed September 26, 1929. Serial No. 395,468.

The present invention relates to the manufacture of a vulcanized rubber product by an improved process wherein there is employed, in addition to the ordinary compounding ingredients, a new type of reaction product capable of imparting age resisting or anti-oxidant characteristics to the rubber product.

It is well known in the art to which this invention pertains that the use of certain organic compounds as accelerators of the rubber vulcanization process is materially lessened because of the fact that the presence of such compounds or of their heat of decomposition or sulfur or other reaction products produced in the curing process apparently cause or aid in causing a relatively rapid deterioration of the vulcanized products. Such rubber products are said to age badly, that is, the rubber becomes hard and loses its resiliency, while other characteristics such as tensile strength and the like are very detrimentally affected. It has now been found that the deterioration of a vulcanized rubber compound may be substantially decreased and the effective life of the product materially lengthened if there be added to the rubber compound prior to the vulcanization step such products as are formed by reacting the condensation product of an aryl hydroxide and an aliphatic aldehyde with an amine, preferably an aromatic primary amine. The preferred proportion of the anti-oxidant used is approximately from 1 to 5% of the weight of the rubber to be vulcanized. However, if desirable, a greater or smaller proportion of anti-oxidant may be employed.

The age resisting characteristics of a vulcanized rubber product can be readily ascertained by means of a so-called accelerated aging test wherein samples of the cured rubber product are subjected in a bomb to the action of oxygen under pressure and maintained for several hours at an elevated temperature. The artificially aged samples are then examined and tested and the results so obtained are compared with similar results obtained by testing the unaged vulcanized stock. The deterioration in properties suffered as a result of the oxidation treatment is indicative of the result that would normally be expected from that particular stock during actual service. Such a test is known as the Bierer-Davis aging test and produces an effect on a vulcanized rubber stock comparable with that resulting from several years of natural aging of the rubber.

One example of the preferred type of compounds, for example, the aniline reaction product of the condensation product of butyl aldehyde and beta naphthol, was prepared in the following manner: Substantially one-half a molar portion of beta naphthol (72 parts) was dissolved in acetic acid at approximately 50° C. Substantially one-half a molar portion of n-butyl aldehyde (36 parts) and approximately 10 parts of a condensation agent or catalyst, for example hydrochloric acid, were added thereto. The yellow oil comprising the reaction product was separated from the acetic acid and further purified by repeated washings with hot sodium carbonate solution and finally with boiling water. To the product thus obtained, substantially 50 parts of aniline and substantially 2 parts of a catalyst or condensing agent, specifically iodine, were added and the mixture heated substantially 6 hours at approximately 200° C. under a pressure greater than atmospheric pressure, for example, approximately 145 pounds per square inch. Any unreacted aniline present in the reaction product thus obtained was separated therefrom, preferably by steam distillation. The residue comprising the preferred material was then washed with hot water.

Other methods of preparing the aniline derivative of the condensation product of substantially equi-molecular proportions of beta naphthol and butyl aldehyde may be employed. Thus, substantially one molar portion of beta naphthol (144 parts) and substantially one molar portion of n-butyl aldehyde (72 parts) were heated to substantially 60 to 100° C. in the presence of substantially 0.5 parts of a condensing agent, for example hydrochloric acid, until reaction ceased. Ammonia was added to the reaction product to neutralize any residual acidity contained therein and then steam was passed therethrough to remove any unreacted beta naphthol or butyl aldehyde. To the product thus formed, after drying, substantially one molar portion of aniline (93 parts) and substantially 50 parts of a condensing agent, specifically anhydrous zinc chloride, were added. The mixture was heated for substantially six hours at approximately 180 to 185° C. under a pressure greater than atmospheric pressure, for example, substantially 100 pounds per square inch. Any unreacted aniline contained in the reaction product was removed by steam distillation and the residue comprising the preferred material was washed with hot water and dried. The product thus obtained was incorporated in a rubber mix in the usual manner comprising

- 100 parts of smoked sheet rubber,
- 40 parts of carbon black,
- 10 parts of zinc oxide,
- 2 parts of a blended mineral oil and rosin,
- 3.25 parts of sulfur,
- 1.0 part of diphenyl-guanidine,
- 1.0 parts of the aniline derivative of the condensation product of beta naphthol and butyl aldehyde.

This stock was then vulcanized by heat curing sheets of the stock in the usual manner for different times at the temperature given by forty pounds of steam pressure per square inch, that is, 287° F. Portions of the rubber stock cured as described were artificially aged by heating samples of the said rubber stock in an oxygen bomb for 30 hours at 70° C. and under an oxygen pressure of 300 pounds per square inch. The results obtained by testing the aged and unaged stocks are given in Table I.

Table I

| Time of cure | Hours aged | Modulus of elasticity in lbs/in² at elongations of— | | Tensile at break in lbs/in² | % Ultimate elongation |
|---|---|---|---|---|---|
| | | 300% | 500% | | |
| 30 mins. at 287°F | 0 | 998 | 2530 | 3285 | 590 |
| Do | 30 | 956 | 2160 | 2245 | 520 |
| 60 mins. at 287°F | 0 | 1448 | 3295 | 4015 | 580 |
| Do | 30 | 1330 | 2650 | 2915 | 560 |
| 90 mins. at 287°F | 0 | 1680 | 3800 | 4195 | 550 |
| Do | 30 | 1485 | | 2800 | 490 |

It is apparent from the data set forth in Table I that the aged rubber stock retained to a marked degree its unaged characteristics.

Another of the preferred class of compounds comprising the aniline derivative of the reaction product of phenol and butyl aldehyde was prepared in the following manner:

Substantially one molar portion of phenol (94 parts) and substantially one molar portion of butyl aldehyde (72 parts) were placed in a reactor and reacted in the presence of approximately 0.5 parts of a condensing or catalytic agent such, for example, as hydrochloric acid. After the reaction was completed, steam containing some ammonia was passed through the reaction product to separate any unreacted phenol or aldehyde and neutralize any residual acidity of any acidity developed by the reaction. To the reaction product thus obtained, substantially one molar portion of aniline (93 parts) and substantially 50 parts of a condensing agent or catalyst, for example anhydrous zinc chloride, were added thereto and the mixture heated for approximately two hours at a temperature of substantially 190 to 200° C. under a pressure greater than atmospheric pressure. Any unreacted aniline present in the reaction product was eliminated therefrom, preferably by steam distillation. The residue, after washing with hot water, was an oil, solidifying at room temperature. The product thus obtained was incorporated in a rubber mix comprising

- 100 parts of smoked sheet rubber,
- 40 parts of carbon black,
- 10 parts of zinc oxide,
- 2 parts of a blended mineral oil and rosin,
- 3.25 parts of sulfur,
- 1.0 part of diphenyl-guanidine,
- 1.0 part of the aniline derivative of the reaction product of phenol and butyl aldehyde.

The compounded rubber stock was then cured by heating in a press in the usual manner and samples of the cured rubber stock were then artificially aged by heating in an oxygen bomb for 30 hours at 70° C., and under an oxygen pressure of 300 pounds per square inch. The results obtained by testing the aged and unaged cured stocks are given in Table II.

Table II

| Time of cure | Hours aged | Modulus of elasticity in lbs/in² at elongations of— | | Tensile at break in lbs/in² | % Ultimate elongation |
|---|---|---|---|---|---|
| | | 300% | 500% | | |
| 30 mins. at 287°F | 0 | 942 | 2415 | 2890 | 550 |
| Do | 30 | 975 | 2140 | 2320 | 535 |
| 60 mins. at 287°F | 0 | 1330 | 3205 | 4240 | 600 |
| Do | 30 | 1390 | 2770 | 3120 | 560 |
| 90 mins. at 287°F | 0 | 1583 | 3545 | 4135 | 580 |
| Do | 30 | 1535 | | 2850 | 485 |

The results set forth in Table II show clearly that the aniline derivative of the reaction product of phenol and butyl aldehyde possesses very desirable anti-oxidant properties.

Another example of the preferred class of anti-oxidants comprises the material formed by reacting aniline with the condensation product of phenol and acetaldehyde. One method of preparing this material comprises the combining of substantially one molar portion of acetaldehyde (44 parts) and substantially two molar portions of phenol (188 parts) in the presence of a small portion of a condensing agent or catalyst, for example 0.1 part by weight of hydrochloric acid.

After the reaction was completed, the crude product was washed with water and dried. Substantially on molar portion of aniline was then added thereto and the mixture heated for approximately six hours at a temperature of approximately 185 to 190° C. under a pressure greater than atmospheric pressure, preferably a pressure of forty pounds per square inch. Any unreacted aniline present in the product was eliminated by steam distillation and the residual product was then purified further by washing thoroughly with hot water.

A sample of the reaction product thus obtained was then incorporated in a rubber stock comprising 100 parts of pale crepe rubber,
5 parts of zinc oxide,
3.5 parts of sulfur,
0.8 parts of diphenyl-guanidine,
2.0 parts of the aniline derivative of the reaction product of 2 mols of phenol with 1 mol of acetaldehyde.

Samples of this stock, after vulcanizing in the usual manner, were then artificially aged by heating in an oxygen bomb for 18 hours at 75° C. and under an oxygen pressure of 400 pounds per square inch. The results obtained by testing the aged and unaged stocks are given in Table III.

*Table III*

| Time of cure | Hours aged | Modulus of elasticity in lbs/in$^2$ at elongations of— | | | Tensile at break in lbs/in$^2$ | % Ultimate elongation |
| --- | --- | --- | --- | --- | --- | --- |
| | | 300% | 500% | 700% | | |
| 30 mins. at 287°F | 0 | 184 | 440 | 1615 | 2355 | 780 |
| Do | 18 | 155 | 533 | 1630 | 2020 | 715 |
| 45 mins. at 287°F | 0 | 185 | 633 | 2190 | 2775 | 745 |
| Do | 18 | 172 | 635 | 2070 | 2130 | 705 |

The results as set forth in Table III clearly show the desirable age resisting qualities of the preferred class of products. An identical rubber stock with the exception that no anti-oxidant was incorporated therein prior to the vulcanization process, on artificially aging in the manner described, melts down in the bomb to a shapeless mass incapable of tensile tests.

It is further seen from the examples set forth that the preferred class of anti-oxidants function satisfactorily in either a pure gum or a heavily compounded stock, such for example as a tread stock.

By the term phenol as employed in the present specification is meant an aromatic hydrocarbon wherein hydrogen atoms only are substituted by one or more hydroxyl groups.

The condensation products of other aryl hydroxides and aliphatic aldehydes than those herinbefore described may be reacted in an analogous manner to that set forth with aromatic primary amines other than aniline and employed as anti-oxidants. Thus, the condensation product of heptaldehyde, propionic aldehyde, aldol, acrolein and crotonaldehyde with phenol, resorcinol, hydroquinone, alpha and beta naphthol and analagous equivalent compounds may be reacted with the toluidines, the xylidines and the like and employed as anti-oxidants.

In all of the examples hereinbefore cited, diphenyl-guanidine was employed as the accelerator because it is known to produce a vulcanized rubber stock possessing poor aging qualities and, therefore, will not mask the effect of the anti-oxidant employed.

The various examples set forth in detail are to be understood as illustrative only and not at all limitative of the scope of the invention. This invention is limited solely by the claims attached hereto as a part of this specification.

What is claimed is:

1. The process of manufacturing an age resisting vulcanized rubber product which comprises curing a rubber composition of vulcanization characteristics in the presence of an anti-oxidant comprising an aromatic primary amine derivative of a reaction product of an aryl hydroxide and an aliphatic aldehyde containing more than one, but less than five carbon atoms.

2. The process of manufacturing an age resisting vulcanized rubber product which comprises curing a rubber composition of vulcanization characteristics in the presence of an anti-oxidant comprising an aniline derivative of a reaction product of an aryl hydroxide and an aliphatic aldehyde containing more than one, but less than five carbon atoms.

3. The process of manufacturing an age resisting vulcanized rubber product which comprises curing a rubber composition of vulcanization characteristics in the presence of an anti-oxidant comprising an aniline derivative of a reaction product of a phenol and an aliphatic aldehyde containing more than one, but less than five carbon atoms.

4. The process of manufacturing an age resisting vulcanized rubber product which comprises curing a rubber composition of vulcanization characteristics in the presence of an anti-oxidant comprising an aniline derivative of a reaction product of phenol and an aliphatic aldehyde.

5. The process of manufacturing an age resisting vulcanized rubber product which comprises curing a rubber composition of vulcanization characteristics in the presence of an anti-oxidant comprising an aniline derivative of a reaction product of phenol and butyl aldehyde.

6. The process of manufacturing an age resisting vulcanized rubber product which comprises curing a rubber composition of vulcanization characteristics in the presence of an anti-oxidant comprising the aniline derivative of the condensation product of substantially equi-molecular proportions of butyl aldehyde and phenol.

7. The process of manufacturing an age resisting vulcanized rubber product which comprises curing a rubber composition of vulcanization characteristics in the presence of an anti-oxidant comprising an aniline derivative of a reaction product of a phenol and an aliphatic aldehyde containing more than one but less than five carbon atoms.

8. The process of manufacturing an age resisting vulcanized rubber product which comprises curing a rubber composition of vulcanization characteristics in the presence of an anti-oxidant comprising an aniline derivative of a reaction product of phenol and an aliphatic aldehyde containing less than five carbon atoms.

9. The process of manufacturing an age resisting vulcanized rubber product which comprises curing a rubber composition of vulcanization characteristics in the presence of an anti-oxidant comprising a primary aromatic amine derivative of a reaction product of a phenol and an aliphatic aldehyde containing more than one but less than five carbon atoms.

10. A vulcanized rubber product possessing age resisting characteristics comprising the vulcanization product of a rubber stock containing prior to the vulcanization of said stock an anti-oxidant comprising an aromatic primary amine derivative of a reaction product of an aryl hydroxide and an aliphatic aldehyde containing more than one, but less than five carbon atoms.

11. A vulcanized rubber product possessing age resisting characteristics comprising the vulcanization product of a rubber stock containing prior to the vulcanization of said stock an anti-oxidant comprising an aniline derivative of a reaction product of an aryl hydroxide and an aliphatic aldehyde containing more than one, but less than five carbon atoms.

12. A vulcanized rubber product possessing age resisting characteristics comprising the vulcanization product of a rubber stock containing prior to the vulcanization of said stock an anti-oxidant comprising an aniline derivative of a reaction product of a phenol and an aliphatic aldehyde containing more than one, but less than five carbon atoms.

13. A vulcanized rubber product possessing age resisting characteristics comprising the vulcanization product of a rubber stock containing prior to the vulcanization of said stock an anti-oxidant comprising an aniline derivative of a reaction product of phenol and an aliphatic aldehyde.

14. A vulcanized rubber product possessing age resisting characteristics comprising the vulcanization product of a rubber stock containing prior to the vulcanization of said stock an anti-oxidant comprising an aniline derivative of a reaction product of phenol and butyl aldehyde.

15. A vulcanized rubber product possessing age resisting characteristics comprising the vulcanization product of a rubber stock containing prior to the vulcanization of said stock an anti-oxidant comprising the aniline derivative of the condensation product of substantially equi-molecular proportions of butyl aldehyde and phenol.

16. A vulcanized rubber product possessing age resisting characteristics comprising the vulcanization product of a rubber stock containing prior to the vulcanization of said stock an anti-oxidant comprising an aniline derivative of a reaction product of a phenol and an aliphatic aldehyde containing more than one but less than five carbon atoms.

17. A vulcanized rubber product possessing age resisting characteristics comprising the vulcanization product of a rubber stock containing prior to the vulcanization of said stock an anti-oxidant comprising an aniline derivative of a reaction product of phenol and an aliphatic aldehyde containing less than five carbon atoms.

18. A vulcanized rubber product possessing age resisting characteristics comprising the vulcanization product of a rubber stock containing prior to the vulcanization of said stock an anti-oxidant comprising a primary aromatic amine derivative of a reaction product of a phenol and an aliphatic aldehyde containing more than one but less than five carbon atoms.

In testimony whereof I hereunto affix my signature.

MAX H. HUBACHER.